United States Patent [19]

Curchod

[11] 4,454,618
[45] Jun. 19, 1984

[54] SYSTEM AND METHOD FOR FORMING CUSTOM-MADE SHOE INSERT

[75] Inventor: Donald B. Curchod, Saratoga, Calif.

[73] Assignee: Amfit, Inc., Sunnyvale, Calif.

[21] Appl. No.: 183,010

[22] Filed: Sep. 2, 1980

[51] Int. Cl.$^3$ ............................................. A43D 9/00
[52] U.S. Cl. ..................................... 12/1 R; 12/146 L
[58] Field of Search ................... 12/146 L, 86.6, 1 R, 12/1 W, 86.5

[56] References Cited

U.S. PATENT DOCUMENTS

| 290,652 | 12/1983 | Stormer | 12/146 L |
|---|---|---|---|
| 2,026,620 | 1/1936 | Finn | 12/142 |
| 2,230,143 | 1/1941 | Hyland | 12/60 |
| 2,323,538 | 7/1943 | Hyland | 12/60 |
| 2,998,983 | 9/1961 | Digate | 282/1 |
| 3,300,802 | 1/1967 | Polleys | 12/86.6 |
| 3,696,456 | 10/1972 | Dunham | 12/146 |
| 3,711,880 | 1/1973 | Dalebout | 12/1 |
| 4,324,118 | 4/1982 | Bruggi | 69/6.5 |

FOREIGN PATENT DOCUMENTS

| 2715906 | 6/1978 | Fed. Rep. of Germany . | |
|---|---|---|---|
| 759013 | 1/1934 | France | 19/1 |
| 761626 | 3/1934 | France | 16/4 |
| 2310845 | 12/1976 | Italy . | |
| 103168 | 10/1941 | Switzerland | 12/146 L |
| 243835 | 2/1947 | Switzerland | 12/146 L |

OTHER PUBLICATIONS

Metaalbewerking, No. 20, p. 426, Mar. 31, 1966, "Spannen op kleefbond".

Primary Examiner—Patrick D. Lawson
Attorney, Agent, or Firm—Flehr, Hohbach, Test, Albritton & Herbert

[57] ABSTRACT

A system and method for forming a custom-made resilient insert for a given person's shoe in which the contour of the support surface of the insert conforms to the contour of the undersurface of a person's foot.

37 Claims, 29 Drawing Figures

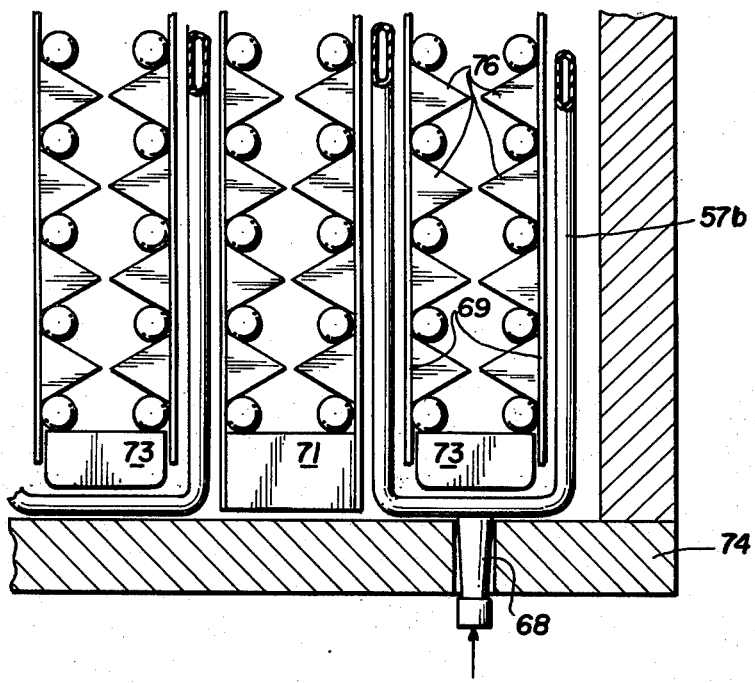
FIG.7
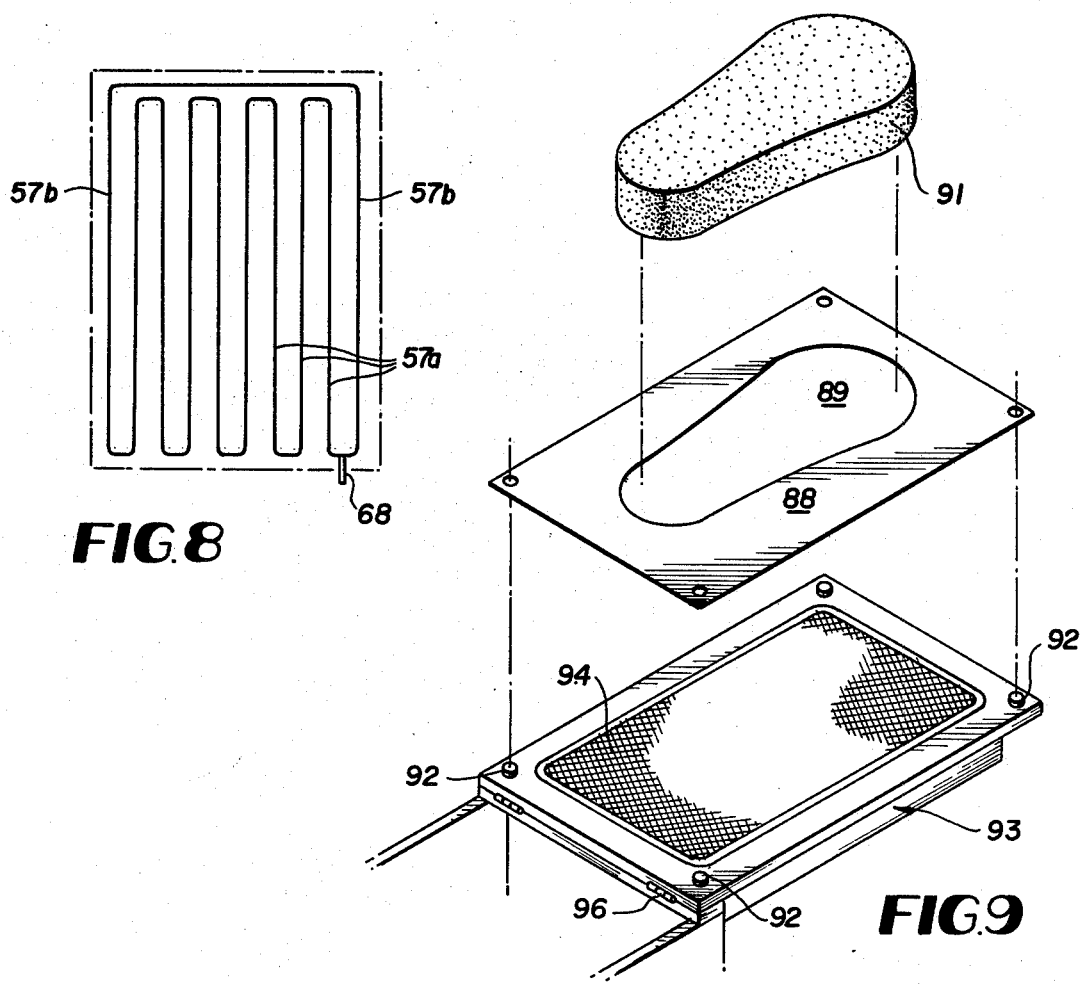
FIG.8
FIG.9

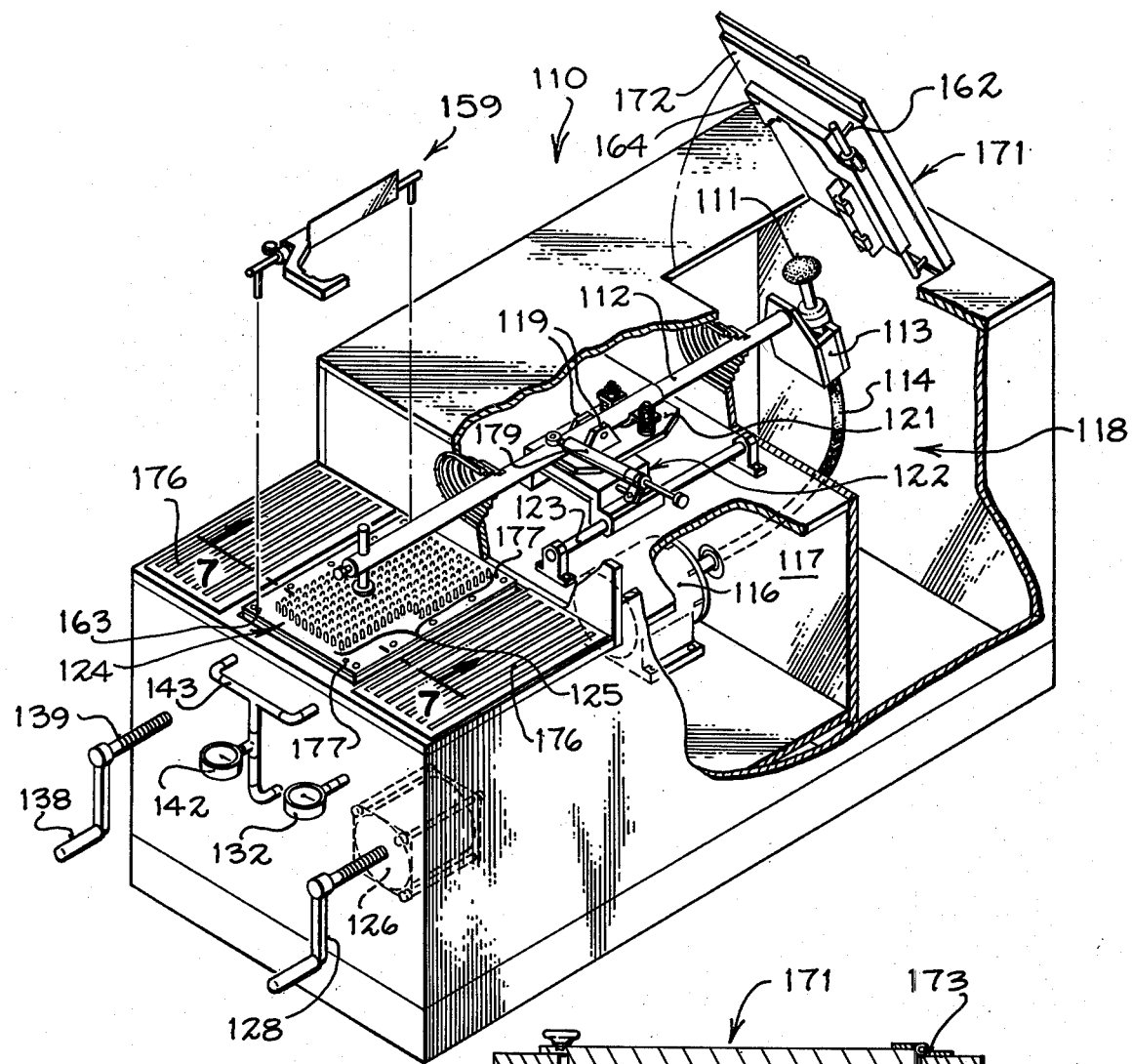
FIG_15
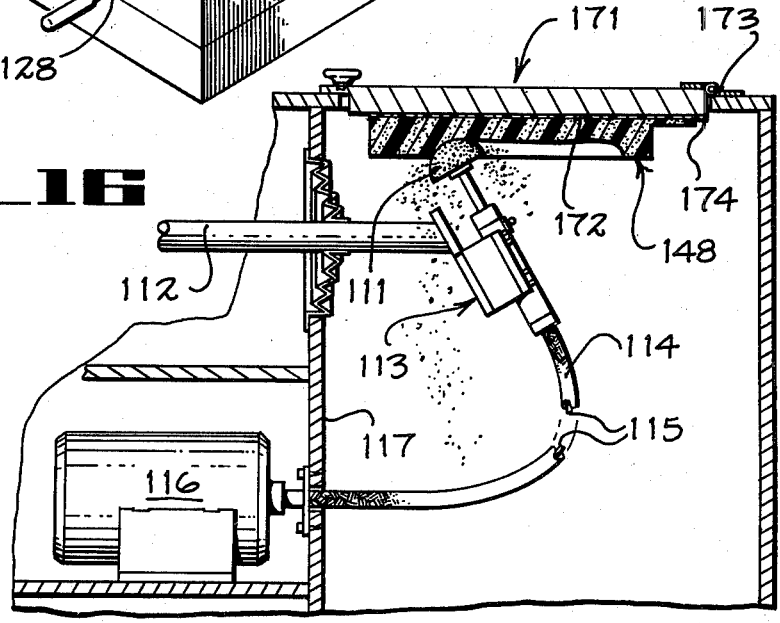
FIG_16

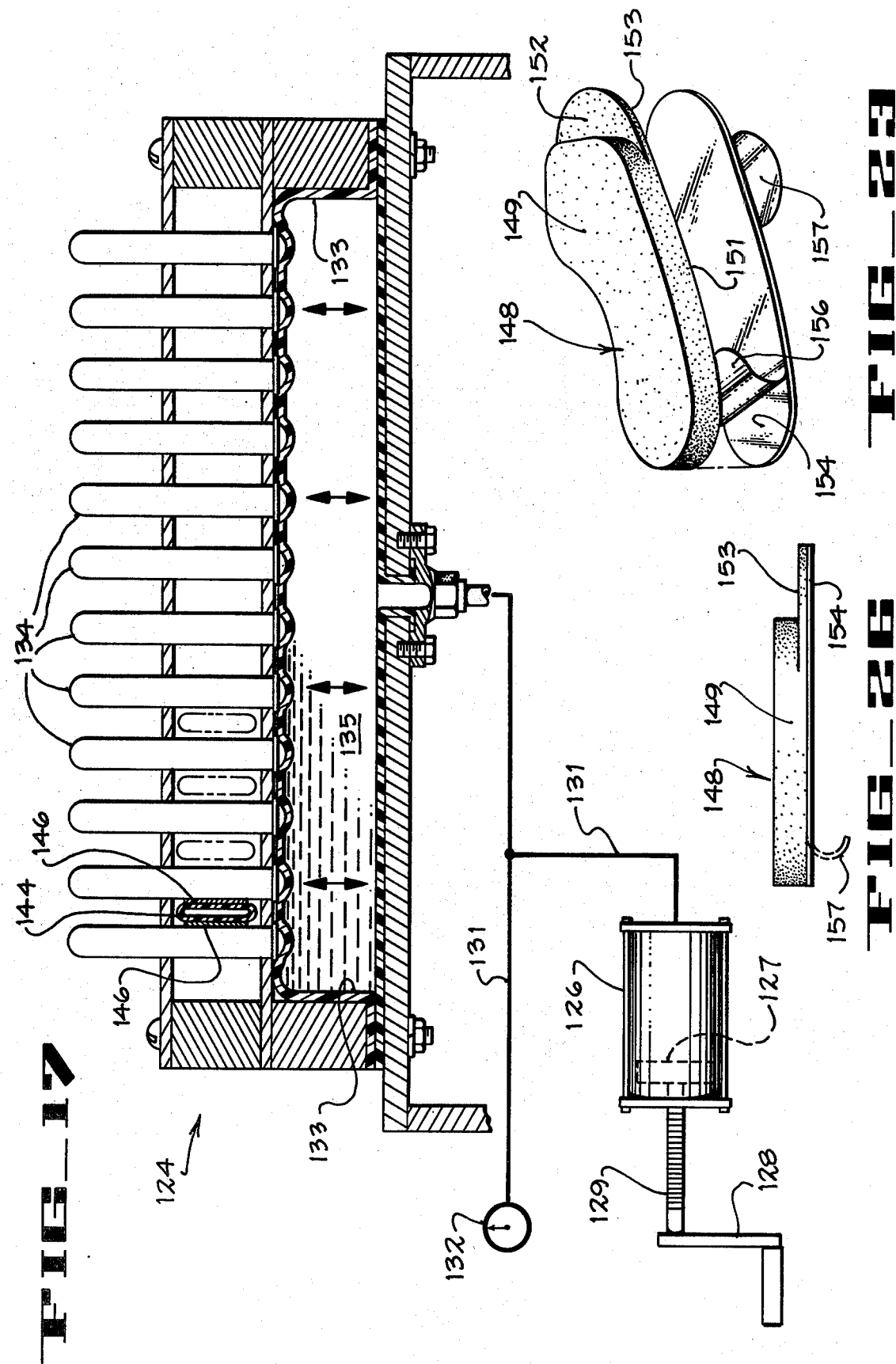

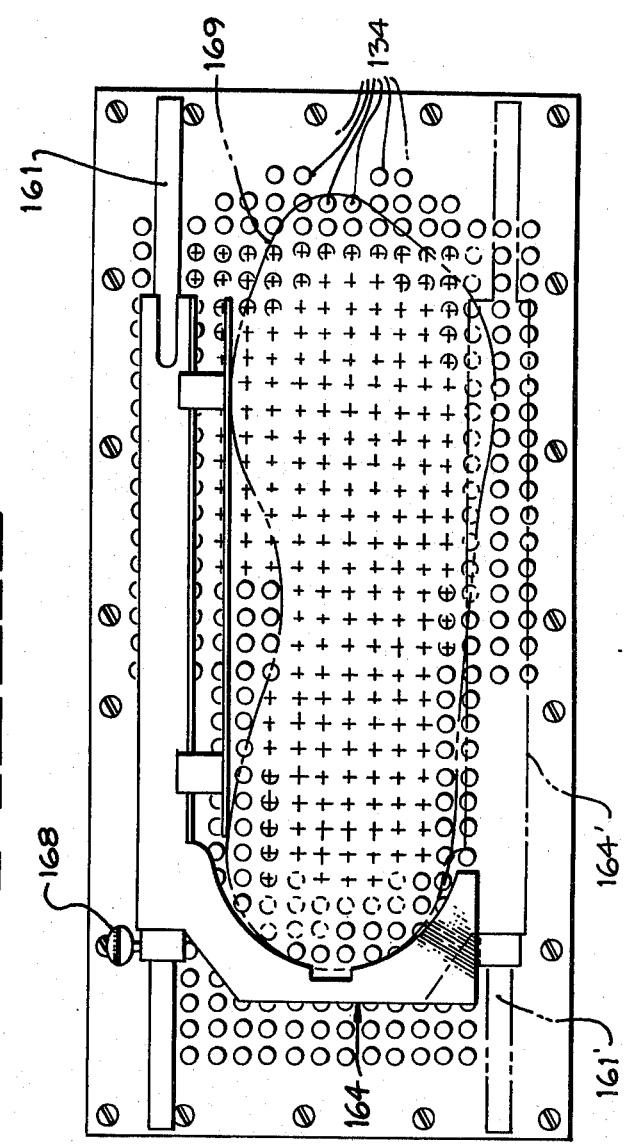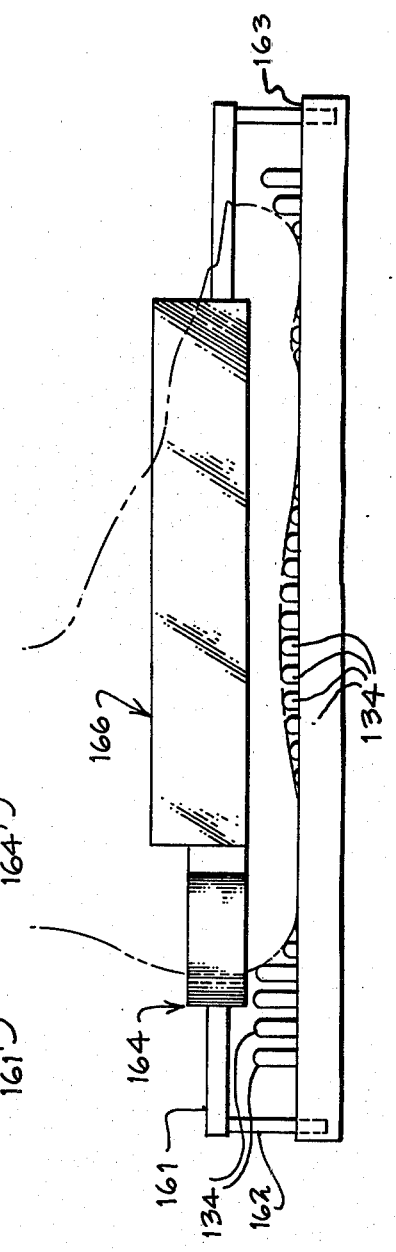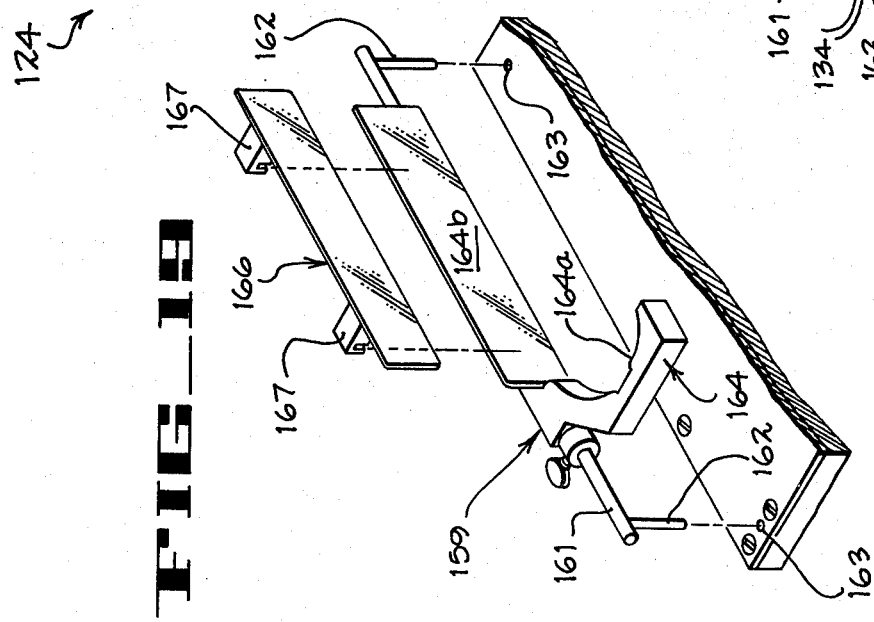

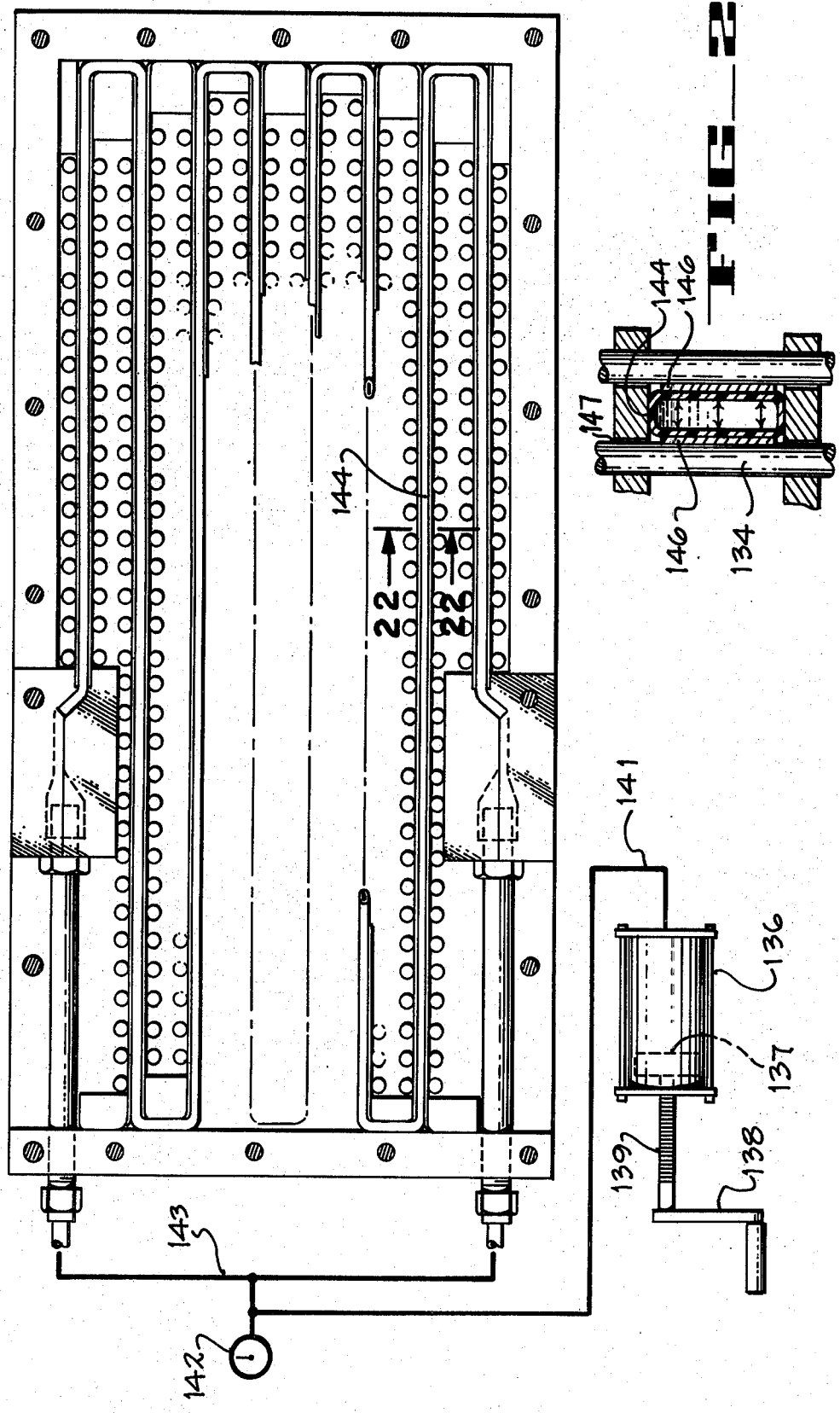

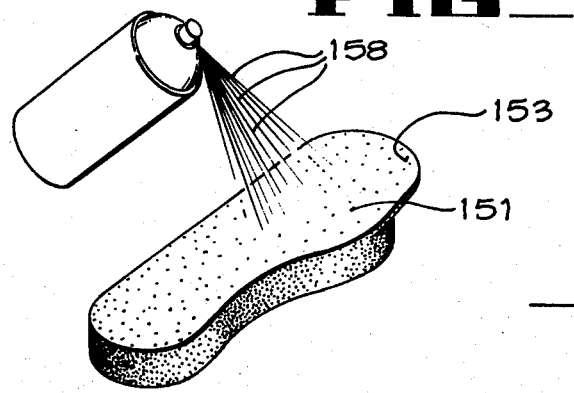
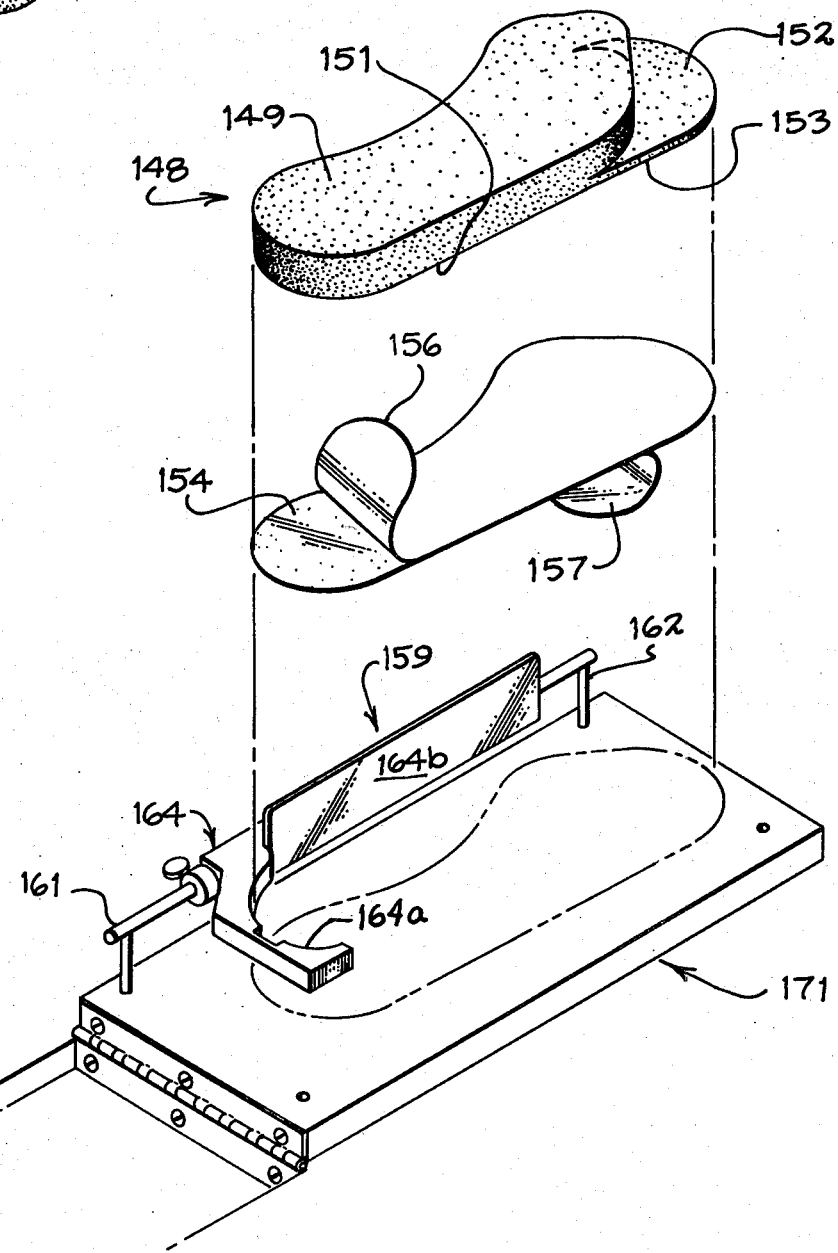

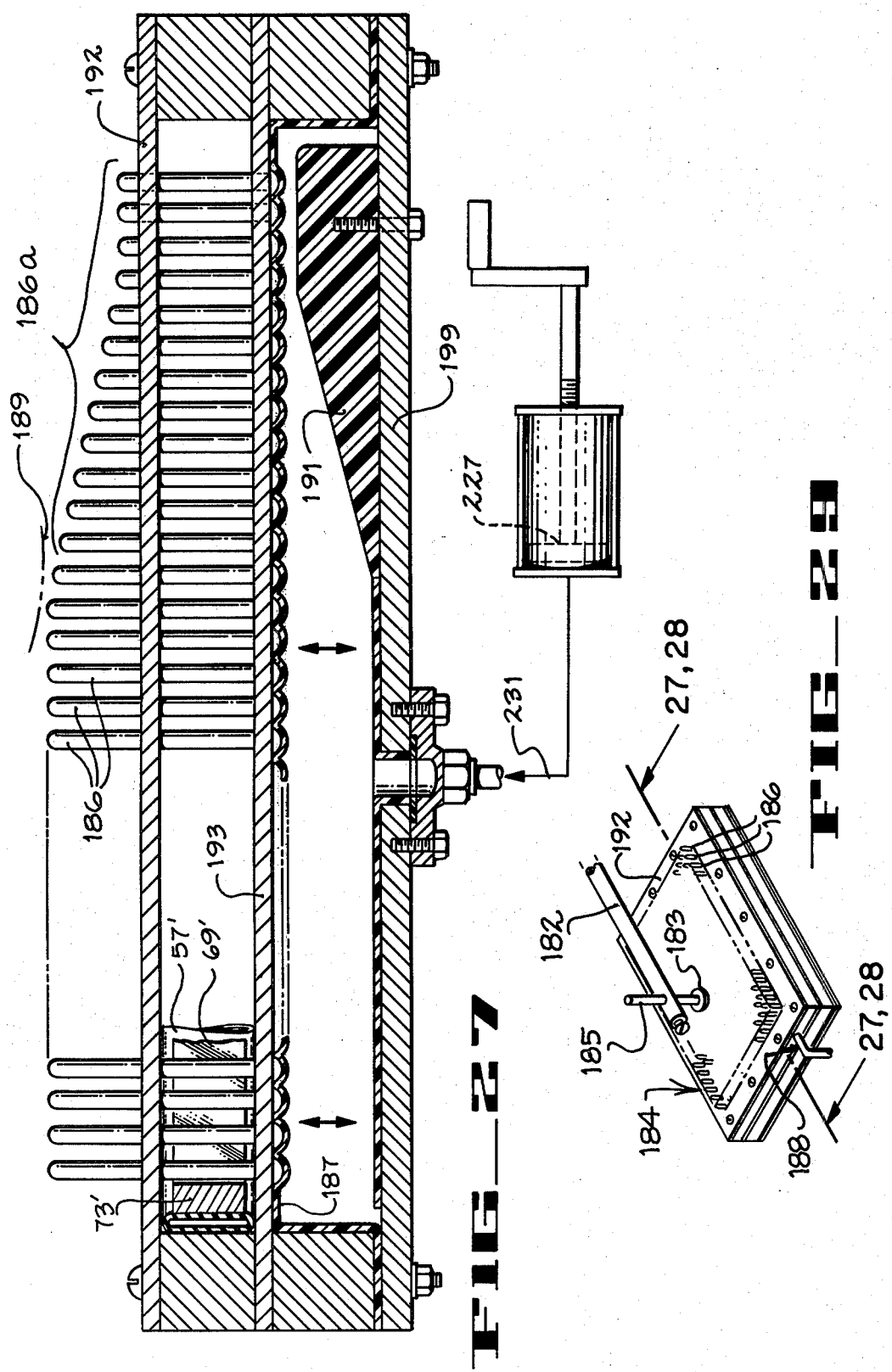

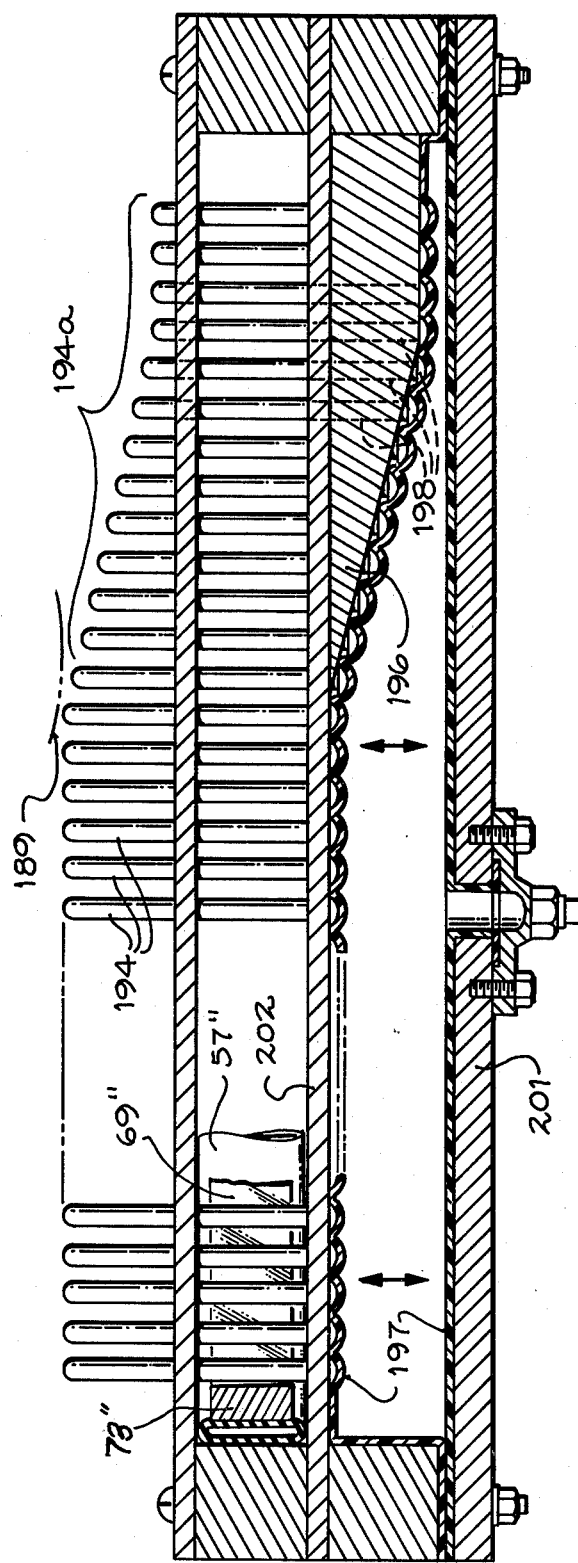

SYSTEM AND METHOD FOR FORMING CUSTOM-MADE SHOE INSERT

This application is a continuation-in-part of application Ser. No. 108,674, filed Dec. 31, 1979, now abandoned.

This invention pertains to a system and method for forming a custom-made insert for a person's shoe.

Heretofore, certain thin, soft pads have been inserted into a person's shoe in order to make the shoe somewhat more comfortable. However, these pads have typically been flat on both top and bottom or preformed to an average foot. By custom-forming the top (i.e. supporting) surface of a shoe insert to conform to the contour of the undersurface of a person's foot the insert can become far more comfortable.

As disclosed herein a machine and method are provided which are sufficiently compact and simple to use as to be suitable for use at shoe stores or other point of sale locations.

In general there has been provided herein a system for forming a custom-made insert for a given person's shoe in which the contour of the support surface of the insert substantially conforms to the contour of the undersurface of the person's foot. The system includes means for shaping a blank of material suitable to form the insert as well as means for selectively making an impression of the contour of the undersurface of the person's foot and for retaining the impression. Means are also provided for sensing the contour of the impression so made. The shaping means is operated in response to the sensing means to shape the blank with an impression corresponding to the first named impression.

It is an object of the present invention to provide a system and method which can be quickly and easily employed to form a custom-made insert for use in a shoe to spread the shock forces at stress points beneath the foot.

It is another object of the present invention to provide a system and method for forming a custom-made insert suitable for point of sale usage.

A further object of the present invention is to provide a system for forming a custom-made insert for a shoe the system having means for shaping a blank of the insert material in response to sensing the contour of means for selectively making and retaining an impression of the undersurface of a person's foot.

Other objects of the invention will become more readily evident from the following detailed description of a preferred embodiment when considered in conjunction with the drawings.

FIG. 7 shows a plan view in enlarged detail showing the disposition of a portion of the locking tubing according to one embodiment the invention;

FIG. 8 shows a diagram in plan view of the configuration of the locking tubing, a portion of which is shown in FIG. 7;

FIG. 9 shows a diagrammatic perspective exploded view of a hinged frame in a fully open position with means for holding a blank thereon in position to be shaped;

FIG. 15 shows a diagrammatic perspective view partially broken away and partially exploded of a machine for forming a custom-made insert according to another embodiment of the invention;

FIG. 16 shows an enlarged side elevation view of the cutting head operating upon a blank carried by the machine of FIG. 15;

FIG. 17 shows an enlarged diagrammatic elevation section view taken along the line 17—17 of FIG. 15 showing a hydraulic system for inflating and deflating the pin support diaphragm;

FIG. 18 shows a plan view of an impression taking means with means for registering a person's foot centrally with respect thereto;

FIG. 19 shows an enlarged perspective detailed view of a portion of FIG. 18;

FIG. 20 shows a side elevation view of a top portion of an impression taking assembly according to one embodiment of the invention;

FIG. 21 shows a diagram in plan view of a hydraulic system for locking the impression taking pins in a given position;

FIG. 22 shows an enlarged section view taken along line 22 of FIG. 21;

FIG. 23 shows a diagrammatic perspective exploded view of a blank to be formed into an insert for a person's shoe;

FIG. 24 shows a perspective view of a procedural step in coating or preparing the underside of a blank of the type shown in FIG. 23;

FIG. 25 shows a diagrammatic perspective exploded view of portions of a blank and an assembly for registering same;

FIG. 26 shows a diagrammatic side elevation of a blank of predetermined shoe size;

FIG. 27 shows a diagrammatic side elevation section view taken along the line 27—27 of FIG. 29 showing an impression taking assembly, with the pin locking means removed for clarity, according to another embodiment of the invention;

Figures 1, 2, 3:
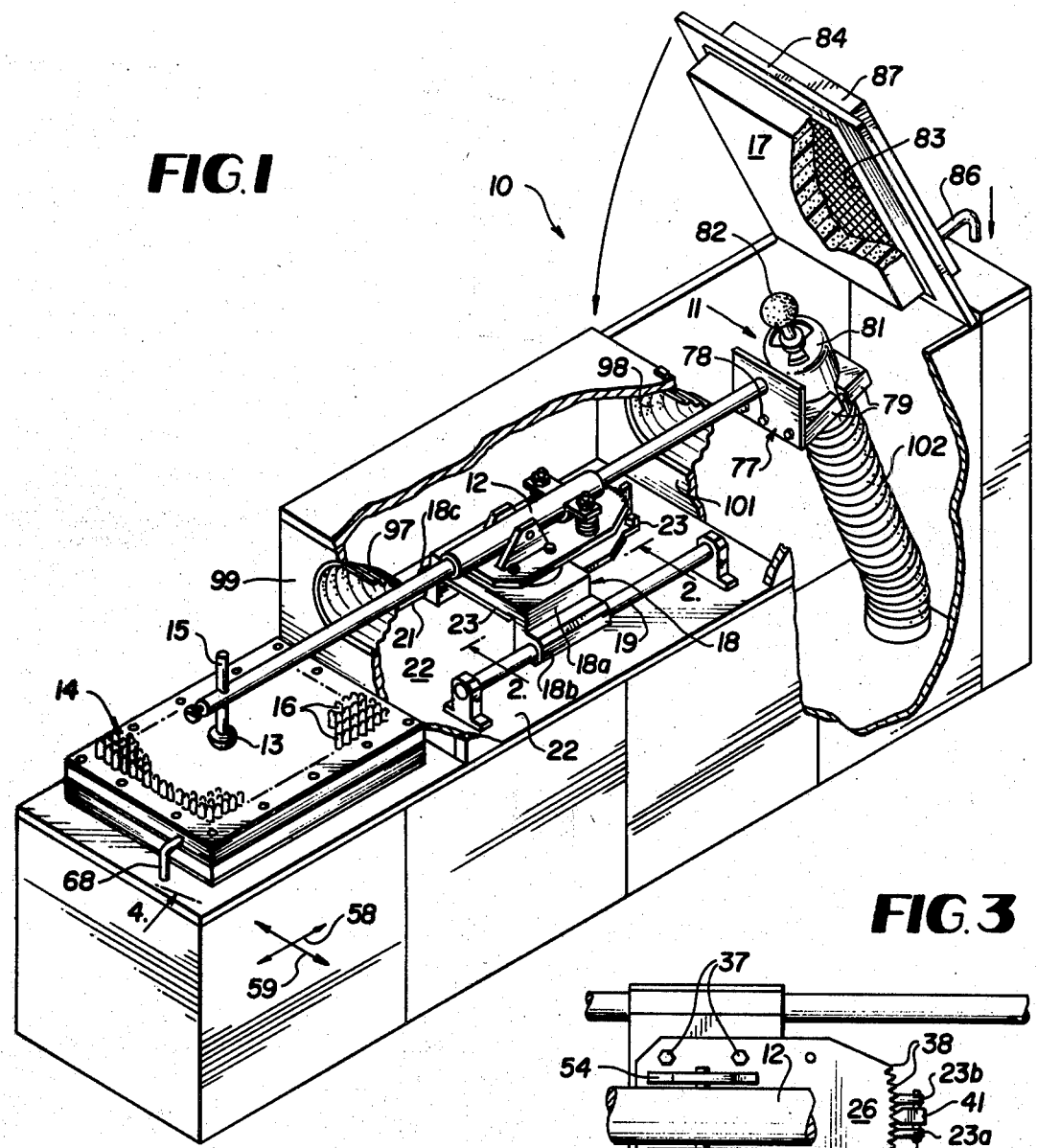
FIG. 1 shows a diagrammatic perspective view, with portions broken away for clarity, of a system for forming a custom-made insert according to one embodiment of the invention.
FIG. 2 shows a side elevation section view in enlarged detail taken along the line 2—2 of FIG. 1.
FIG. 3 shows a plan view in enlarged detail of a portion of the carriage structure shown in FIGS. 1 and 2.

FIG. 28 shows a diagrammatic side elevation section view taken along the line 28—28 of FIG. 29 showing an impression taking assembly, with the pin locking means removed for clarity, according to yet another embodiment of the invention; and FIG. 29 shows a diagrammatic perspective view in reduced scale of an impression taking assembly according to either of the last two embodiments of the invention.

Referring to FIGS. 1–16, system 10 comprises a cutting head assembly 11 carried on one end of an elongate operating arm 12 and a tracing head 13 having a hemispherical contact surface 13a carried on the other end of arm 12. Tracing head 13 is disposed to cooperate with an impression taking assembly 14.

In general, assembly 14 is characterized by a number of axially movable pins 16 and inflatable diaphragm 56 for yieldingly urging the pins upwardly to a predetermined position. While pins 16 are in their upwardly disposed positions a person places a foot upon the pins in order to depress the pins in a configuration conforming to the undersurface of the foot. Means for locking pins 16 in their depressed positions is provided whereby tracing head 13 can be moved across all of the pins to simultaneously move cutting head assembly 11 to prepare a blank 17 of foam rubber of other suitable insert material to conform to the contour defined by the configuration of pins 16.

Means supporting operating arm 12 to move longitudinally between advanced or retracted positions and to move laterally from side to side is best shown in FIGS. 1, 2 and 3 as now to be described.

The means for moving cutting head assembly 11 in response to the movements of tracing head 13, as noted, includes elongate operating arm 12. A carriage assembly 18 supports arm 12. Guide means in the form of spaced parallel guide rails or rods 19, 21 fixed in spaced relation above the top surface of a base plate 22 support assembly 18 for movement therealong. Assembly 18 includes a carriage body 18a formed to span the spacing between rods 19, 21 and to ride therealong. Accordingly, two sides of carriage body 18a are formed with elongate bearing housing portions 18b, 18c. Each portion 18b, 18c includes roller bearings (not shown) serving to support assembly 18 for movement between retracted and advanced positions along rods 19, 21.

Assembly 18 further includes means supporting arm 12 to pivot to move assembly 11 from side to side and to permit tracing head 13 to travel across the configuration of pins 16 of assembly 14. By supporting arm 12 to move its opposite ends from side to side, tracing head 13 can travel between retracted and advanced positions along various lateral positions disposed from side to side of the top of assembly 14.

Accordingly, carriage assemby 18 comprises a bottom plate 23 secured by bolts 24 to the underside of carriage body 18a.

An opening centrally of body 18a serves to contain bearing means for pivotally supporting a top plate 26 carrying arm 12. Accordingly, the bearing means comprises lower and upper truncated conical race members 27, 28 disposed with their smaller circumferences in closely spaced confronting relation so as to define an inner ball race 29 containing ball bearings 31. A groove 30 confronting race 29 serves as the outer ball race.

A retaining lip 33 around the interior periphery of the opening in body 18a engages a relatively narrow peripheral flange 32 of member 27. Bolts 24 draw body 18a downwardly toward the top surface of plate 23 and at the same time serve to retain race member 27 thereagainst.

Race member 28 includes a peripheral flange 34 disposed upon a felt dust seal 36. Members 27, 28 are held together by means of elongate bolts 37 which draw the bottom member 27 upwardly toward member 28 so as to retain member 27 substantially in a fixed position against lip 33. Members 27, 28 rotate by virtue of the presence of the ball bearings 31. At the same time bolts 24 hold the entire assembly lightly to the bottom plate 23.

The array of pins 16 in assembly 14 is arranged in columns and rows represented by arrows 58, 59 respectively. Thus, top plate 26 can pivot to move the ends of arm 12 from side to side to permit the tracing head to be disposed variously among the array of pins 16 while at the same time causing the cutting head assembly 11 to make corresponding movements.

In the foregoing system the blank 17 is positioned upside down and reversed from side to side with respect to the impression formed among pins 16 so that, as tracing head 13 follows the contour defined by the impression, a corresponding impression will be formed in blank 17. The vertical pivot axis defined through race members 27, 28 and pivot pin 52 is disposed substantially half-way between tracing head 13 and cutting head 82 so as to insure a faithful reproduction. As thus arranged a relatively compact unit can be provided in which the "dust" created from the cuttings or particles derived from the action of head 82 can be easily contained within the chamber surrounding assembly 11.

Means for holding arm 12 at each of a number of various positions corresponding to the columns 58 of pins 16 in assembly 14 serves to restrict lateral movement of arm 12 during movement of carriage assembly 18 between retracted and advanced positions. This insures that all pins 16 will be contacted by tracing head 13 as described further below. Accordingly, the leading edge of top plate 26 includes a number of notches 38 corresponding to the number of columns of pins 16 disposed laterally of the axis of arm 12.

Bottom plate 23 carries a selectively operable detent assembly 39 comprising a detent element 41 formed with a tapered knife edge portion 41a for engaging each of the notches 38. A pivot pin 42 carried in a block 51 disposed upon the top surface of bottom plate 23 supports element 41 for movement between advanced and retracted positions as indicated by arrow 43. The right hand end of bottom plate 23 (as shown) terminates in a pair of spaced portions 23a, 23b serving to accommodate the lower end of element 41 therebetween and further serves to support block 51 carrying pivot pin 42. Block 51 spans across the gap between portions 23a and 23b and is secured thereto from beneath by fastening means such as a screw (not shown). In order to provide additional strength to this portion of bottom plate 23 portions 23a, 23b can be extended and joined at their outer ends in order to define the gap therebetween as a rectangular opening. An air operated pneumatic cylinder 44, pivotally mounted at its left end as shown in FIG. 2 by pivot pin 46, carries a clevis 47 on the outer end of a piston rod 48.

As thus arranged, injection of air into cylinder 44 via an inlet 49 serves to move rod 48 to the right as shown thereby engaging element 41 with an associated notch 38. In this manner top plate 26 becomes locked against lateral movement with respect to bottom plate 23. While plates 23 and 26 are held against lateral movement, tracing head 13 can be moved along the column of pins 16 associated with the notch 38 then engaged by element 41. By stepping from one notch 38 to the next it is possible to insure that head 13 will contact all pins in each given column.

Arm 12 pivots up and down so that tracing head 13 rises and falls with the contour defined by the configuration of pins 16 of assembly 14. Pivot pin 52, which is carried by arm 12 and supported at its ends by trunnion plates 53, 54 on top plate 26, supports arm 12 for such movement.

Figure 4:
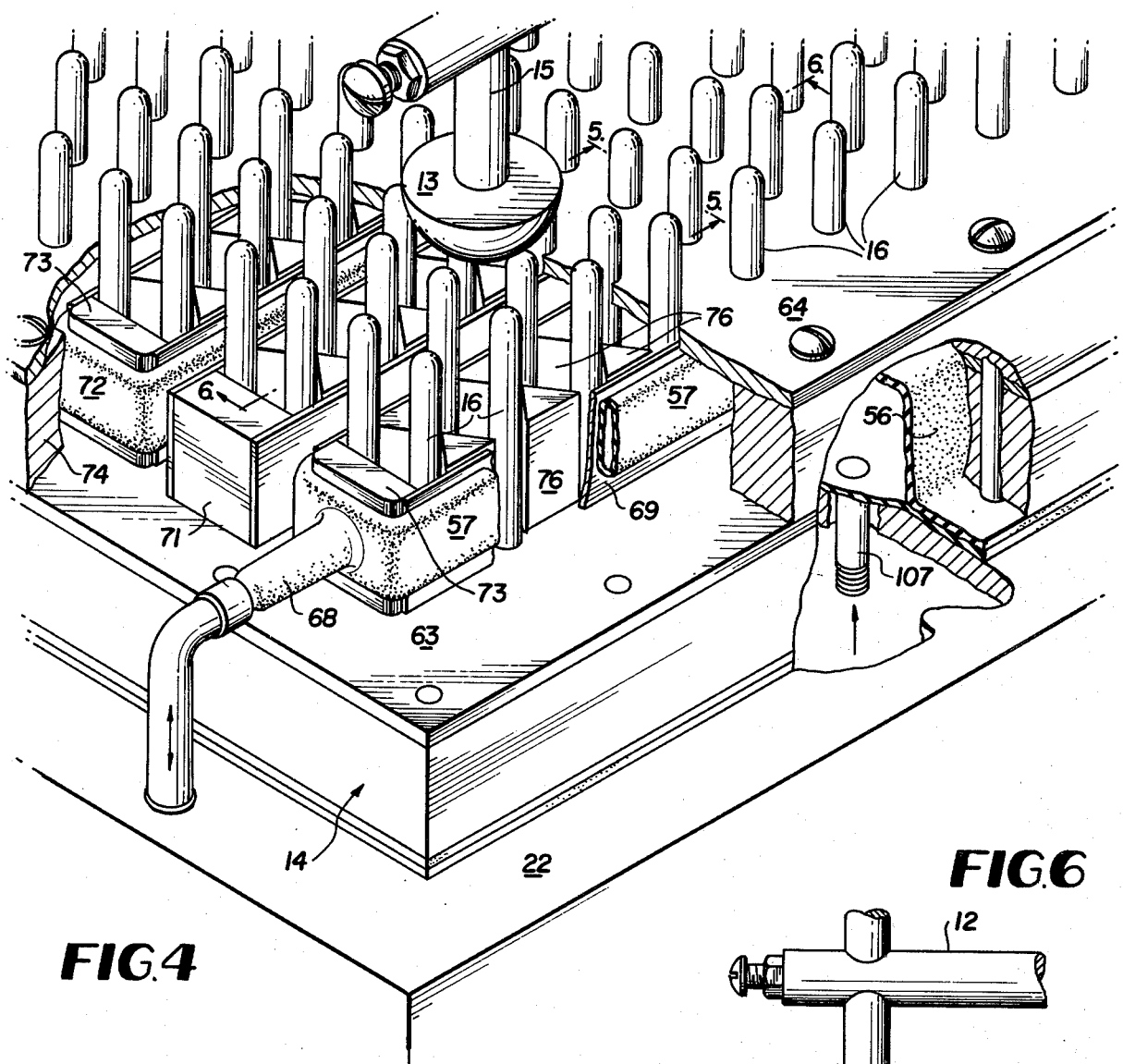
FIG. 4 shows a diagrammatic perspective view in enlarged detail, with portions broken away for clarity, taken in the region of the enlarged numeral 4 shown in FIG. 1.
Figures 5, 6:
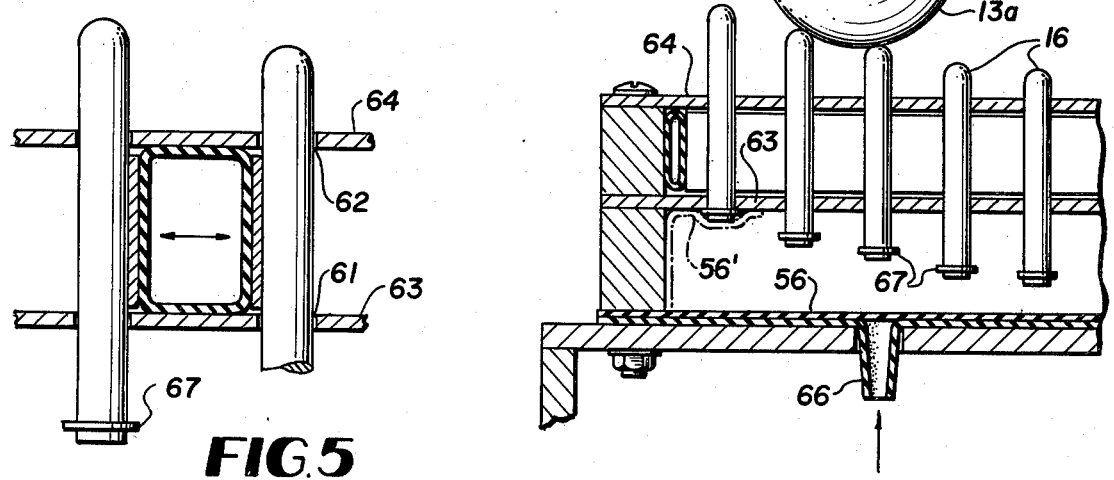
FIG. 5 shows an elevation section view in enlarged detail taken along the line 5—5 of FIG. 4.
FIG. 6 shows an elevation view in an enlarged detail taken along the line 6—6 of FIG. 4.
Figure 12:
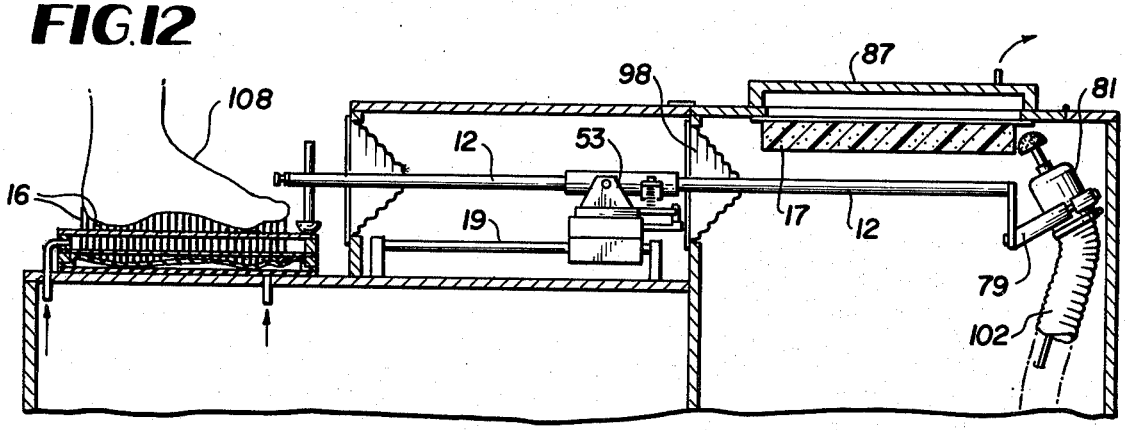
Figure 13:
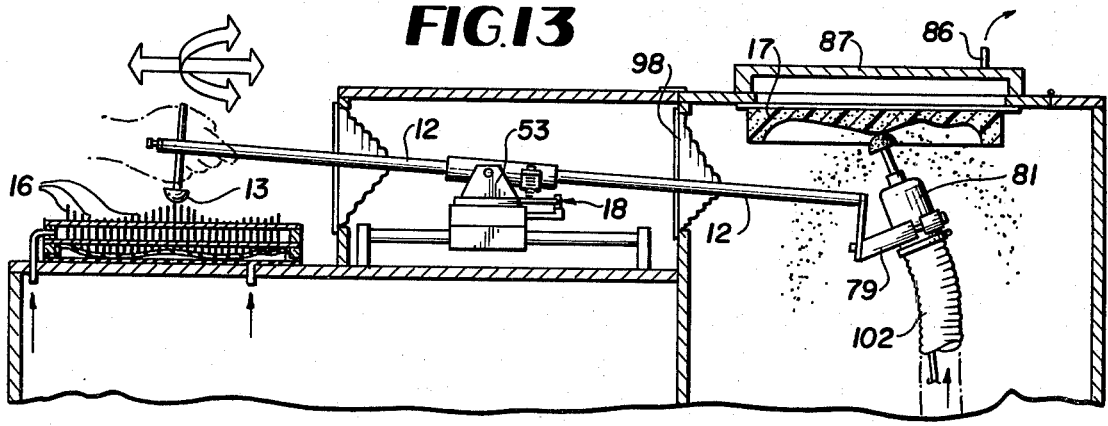

Means as shown in FIGS. 4, 5 and 6 selectively forms a configuration defining the undersurface contour of a given person's foot. An array of elements such as pins 16 are movable between lowered and raised positions. Means such as the inflatable diaphragm 56 yieldingly urges pins 16 toward their raised positions against the downward force of a given person's foot as shown in FIG. 12. The foot disposed thereon serves to depress pins 16 selectively in accordance with the contour of the underside of the foot. Means for locking the pins 16 thereafter in their depressed positions to maintain the defined contour of the undersurface of the foot comprises an elongate inflatable expansive tubing 57 arranged as now to be described.

Pins 16 are guided between their raised and lowered positions by disposing each pin 16 in its own associated pair of axially spaced aligned openings 61, 62 as formed respectively in plates 63, 64. Means for yieldingly urging all pins 16 upwardly to a predetermined degree includes the diaphragm 56 which can be inflated and deflated via the flow passage 66. The bottom end of each pin 16 carries a snap ring 67 having a diameter larger than opening 61 so as to arrest the upward movement of pins 16 under the action of diaphragm 56 when inflated to a phantom line position 56' as shown in FIG. 6.

Means for selectively locking pins 16 in a depressed position under the weight of and in conformity with the contour of a person's foot disposed upon the upper ends of pins 16 comprises an elongated inflatable expansive tubing 57 disposed in a serpentine configuration between adjacent pairs of columns of pins 16 for urging pins 16 laterally to the side of tubing 57 in response to inflation of the tubing. In this manner pins 16 are forced into a holding engagement with the edges of their aligned axially spaced openings 61, 62.

As shown in FIGS. 4 and 8, tubing 57 is selectively inflated and deflated via the flow passage 68. Tubing 57 includes a number of lengths 57a disposed in a serpentine configuration between adjacent pairs of columns of pins, and a pressure balancing branch 57b which is coupled directly from flow passage 68 to the opposite end of the serpentine portions 57a so as to supply and withdraw fluid to all sections of tubing 57 as quickly as possible since both ends of the tubing connect to flow passage 68.

In order to prevent the inflating tubing 57 from protruding between adjacent pairs of pins 16 elongate thin flat retaining strips or members 69 are disposed on opposite sides of each stretch of tubing 57. All strips 69 are of the same length as all other strips 69. At one end, strips 69 are joined to a spacer block 71 and extend to the back corner of the block. At the other end, strips 69 lie alongside a shorter spacing block 73 so as to permit the short lateral loop 72 of tubing 57 to pass between the end wall 74 and the adjacent pair of pins. Blocks 73 preferably are floating and unattached to the retaining strips 69.

In addition, it has been found advantageous to apply a wedging force to pins 16 to remove substantially all clearance between pins 16 and their guide openings 61, 62 after tubing 57 has been inflated. In this manner pins 16 are believed to be more securely held against axial movement. Accordingly, as shown in FIG. 7 wedge shaped elements 76 are loosely disposed to "float" between adjacent pairs of pins 16 so that upon inflation of tube 57 the retaining strips 69 will be urged against the backside of wedging elements 76 to force them between their associated pairs of pins.

Cutting head assembly 11 serves to shape the contour of the surface of blank 17 in accordance with the configuration of the contour as defined by the configuration of pins 16 after they have taken an impression of the contour of the undersurface of a person's foot. Assembly 11 comprises a support bracket 77 including a transversely disposed mounting plate 78 and a clamp 79 for engaging the housing of a motor 81 for driving a substantially spherical abrasive cutting head 82 of suitable material, such as steel wool, for example.

As shown in the embodiment of FIG. 1, means for holding a blank 17 in position to be operated upon by cutting head 82 includes an open mesh screen 83 mounted in a frame 84 hinged to the edge of a top access opening for the cabinet of the system. Accordingly, frame 84 is lowered to a closed position overlying head 82. Head 82 will be in a position to be moved against blank 17 in accordance with the dictates of the configuration of pins 16. Blank 17 is held in place by applying a suction to the back of blank 17 via the flow passage 86 coupled into a low pressure air chamber 87 open on the side covered by screen 83. As thus arranged the suction applied to blank 17 tends to hold it in place against screen 83 while the cutting head 82 operates against the exposed surface thereof.

Another embodiment for holding the blank in position to be shaped by cutting head 82, as shown in FIG. 9, includes one of a series of thin semi-rigid templates 88 each formed with an opening 89 shaped substantially to the shoe size of the person for whom the custom-made insert is being prepared. Short mounting studs 92 carried at the corners of a low pressure air chamber 93 engage openings at the corners of a template 88. Chamber 93 is formed as described above with an open side covered by an open mesh screen 94 to act as a backing member to both the template 88 and blank 91 when disposed in opening 89. Also as noted above, the low pressure air chamber 93 is pivotally supported by means of hinge 96.

Inasmuch as the cutting head 82 operates at high speed when cutting against the foam rubber surface of blank 17 or blank 91 a substantial quantity of particles is discharged into the chamber where assembly 11 is operating. In order to permit arm 12 to be manipulated as above described and to be isolated from the aforementioned particles, a pair of expansible seals 97, 98 are secured at their inner circumference to arm 12 and at their outer circumference to the end walls 99, 101 forming a portion of the chamber within which assembly 19 operates. At the same time a vacuum is drawn on the chamber containing assembly 11 through the relatively large diameter flexible boot or conduit 102. Conduit 102 supplies a flow of cooling air to motor 81 which not only cools motor 81 but also serves to prevent an inordinate accumulation of cuttings from collecting within motor 81. Further, the supply of air via conduit 102 also assists in increasing the vacuum drawn against blanks 17 or 91 when carried by the hinged frame 84.

Figure 14:
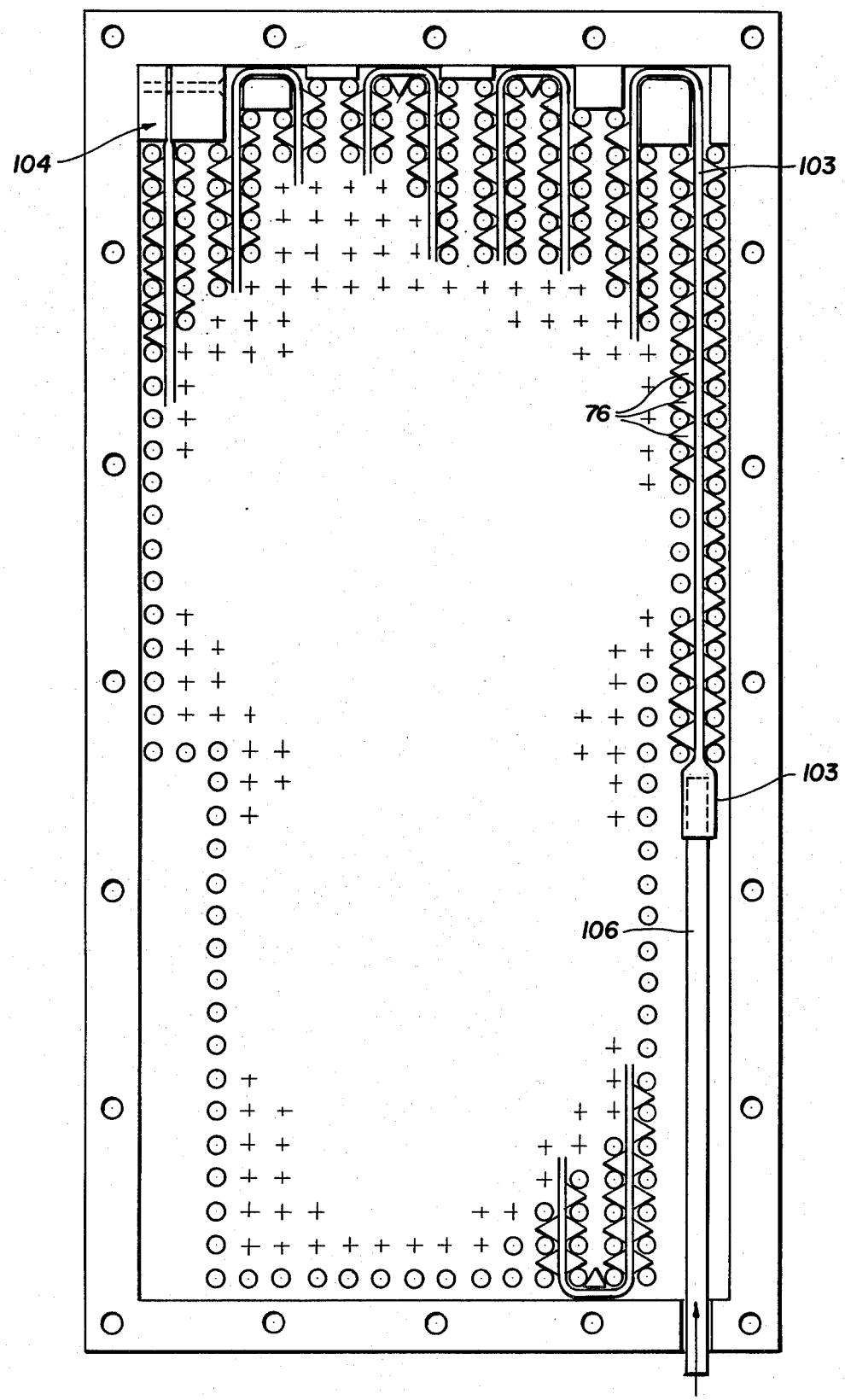
FIG. 14 shows a diagrammatic plan view according to another embodiment of the serpentine inflatable locking tube.

Another embodiment for supplying air to tubing 57, as shown in FIG. 14, includes a single length of tubing 103 pinched off at its remote end by means of a clamp 104 while the inlet end is mounted upon the end of an elongate tube 106.

As shown in FIGS. 1 and 2, means ar further provided for biasing the "cutting" end of operating arm 12 upwardly toward blank 17 or 91 and for urging tracing head 13 downwardly against the top ends of pins 16 to relieve the force required to manipulate arm 12. Accordingly, a U-shaped strap 55 located between pivot pin 52 and assembly 11 serves to carry arm 12 upwardly as urged by means of compression springs 60. Bolts 65 extend through strap 55 on opposite sides of arm 12 and also extend through plate 26 so as to be able to adjust the action of springs 60 and strap 55. In addition to the above, the presence of the spring-loaded strap 55 serves to provide a resillient mounting against which the far end of operating arm 12 can drop so as to prevent damage thereto in the event of an inadvertent release of control handle 15.

The crown or cutting portion of cutter head 82 has the same arc as tracing head 13 so as to produce a faithful copying of the contour defined by the configuration of pins 16.

Figure 10:
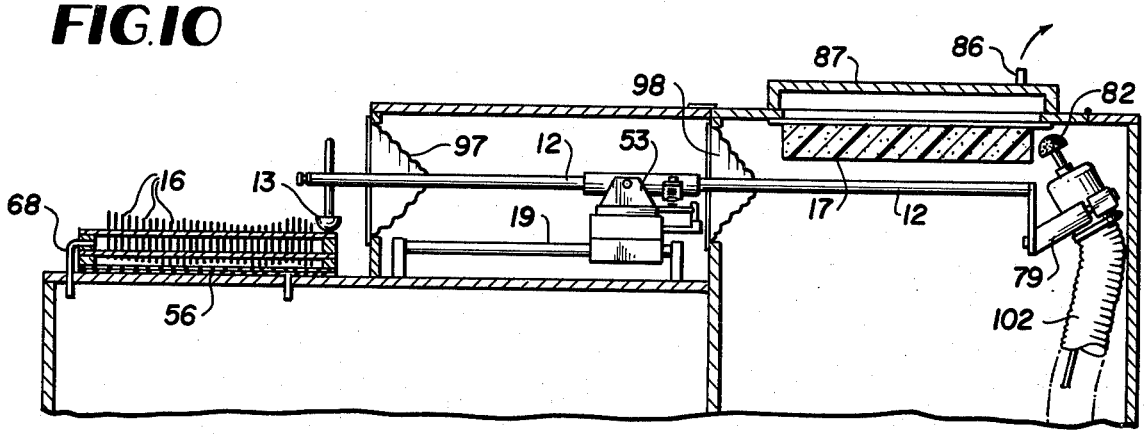
FIGS. 10–13 show a diagrammatic elevation section view of the system as shown in FIG. 1 in successive stages of operation for carrying out the method according to the invention.
Figure 11:
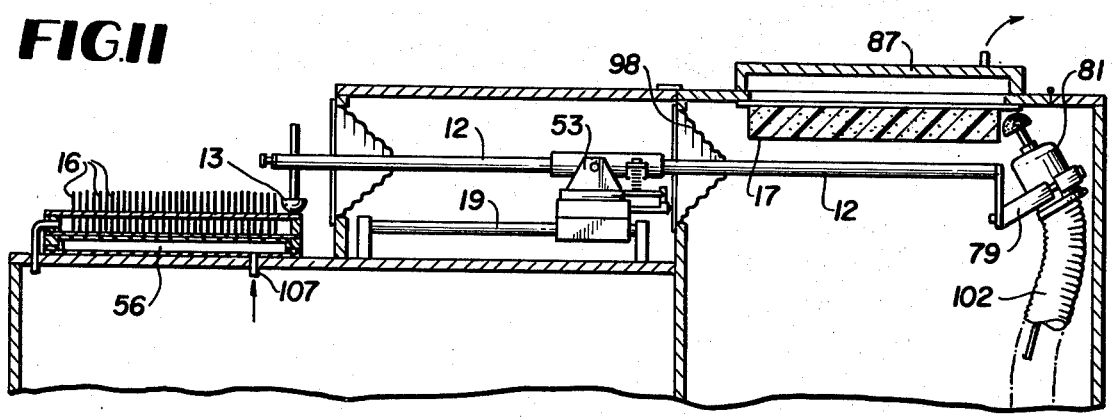

Operation of the system described above is illustrated in FIGS. 10 through 13 as now to be described. In FIG. 10 it is to be noted that diaphragm 56 lies deflated and pins 16 are randomly disposed. In FIG. 11 all pins 16 are moved to a predetermined position by inflating diaphragm 56 via flow passage 107. While maintaining pressure in diaphragm 56 a person's foot 108 is placed downwardly onto the upper ends of pins 16 so as to cause them to yieldingly conform to the contour of the undersurface of the foot. The locking tubing 57 (see FIGS. 4-8) is then inflated in order to hold all of the pins and retain the impression so made. Diaphragm 56 typically remains inflated to assist tubing 57 in holding pins 16 in their depressed positions. With the pins so held in position, tracing head 13 can be moved across the tops of pins 16 to cause cutting head 82 and motor 81 to be moved in accordance with the movements of tracing head 13 to form a blank having a contour corresponding to the contour of the undersurface of a person's foot.

In order to obtain a faithful copy of the contour defined by the configuration of pins 16 after they have taken an impression of the contour of the underside of a person's foot while providing a relatively compact machine, the system arrangement is characterized by disposing the array of pins 16 to extend in one direction, disposing the face of a blank 17, 91 to be operated upon in an opposite direction, employing the opposite ends of an operating arm in working relation to the array of pins 16 and the surface of blank 17, 91 preferably by use of a pivot intermediate the ends of the arm. While blank 17 is formed as a rectangular block of material, it is readily evident that after so forming the contour upon blank 17 it can be cut to an appropriate shoe size to form an insert. However, it is believed preferable to commence initially with a blank 91 of the type corresponding substantially to a person's shoe size as shown in FIG. 9, and an associated corresponding one of a series of templates 88.

The system as described above accordingly carries out the steps of making an impression of the contour of the undersurface of the person's foot. A blank of material of a type from which the insert is to be formed is disposed at a position remote from the impression. The contour of the impression is traced while forming a corresponding contour in a face of the blank so disposed. The face of the blank is disposed so as to be directed away from that of the impression. Finally, for a given person the further step of making another impression of the undersurface of the person's other foot is employed using the same means as used to make the first impression.

While the foregoing system has been disclosed as being an air operated system, it is contemplated that other fluids can be used in a system of the kind described (or with slight variations) such as hydraulic fluids. Thus, according to another embodiment of the invention as shown in FIGS. 15-25, an insert preparing machine 110 provides a system for forming a custom-made insert for a given person's shoe in which the support surface of the insert conforms to the undersurface of the person's foot with a load applied thereto as desired. The system comprises means serving to form an impression of the contour of the undersurface of the person's foot while a cutting head is operated to relieve material from a blank in conformance with the impression so made.

Accordingly, machine 110 includes a cutting head 111 comparable to cutting head 82 above described. An elongate operating arm 112 carries a support assembly 113 on one end for head 111 which is driven by a rotating cable 115 disposed within the flexible sheath 114. Thus, one end of the cable 115 operates head 111 while the other end of cable 115 is coupled to the drive motor 116 disposed behind a partition 117. As thus arranged, cutting head 111 operates within a collection chamber 118 which serves to collect all of the dust resulting from the cutting operation.

In the manner noted above, a trunion 119 supports the arm 112 for vertical movement while a top plate 121 is supported in bearings to permit lateral movement of arm 112. Longitudinal movement of arm 112 is achieved by the movement of carriage assembly 122 mounted on linear bearings (not shown) for movement along guide rods 123.

Means serving to form an impression of the contour of the undersurface of a person's foot comprises the impression taking assembly 124, as now to be described, employing an array 125 of vertically movable pins 134.

Initially, for better understanding of the machine, a hydraulic system including a diaphragm 133 (see FIG. 17) is employed to urge pins 134 upwardly to their maximum position. At that point a person standing on the machine will place one foot on the pins for taking an impression. Then the pressure beneath the pins is released so that they fall to their retracted positions. Subsequently, hydraulic pressure is inserted back into the diaphragm 133 which urges the pins upwardly as desired. For this purpose a pressure meter 132 is provided so that the load applied to the person's foot can be detected directly. Having thus established a selected "loading" against a person's foot on the pins, they are then locked in place so that they can retain the impression thus made.

Thus, as shown in FIG. 17, the hydraulic cylinder 126 includes a piston 127 which can be advanced and retracted by movements of a crank 128 operating a threaded drive stem 129 coupled between crank 128 and piston 127. As can be readily seen from the diagram of FIG. 17, as piston 127 advances to the right, the pressure increases in the hydraulic lines 131 as directly detected by meter 132.

The hydraulic liquid 135 discharging from cylinder 126 inflates diaphragm 133 thereby urging pins 134 upwardly to their maximum extent. The force acting against diaphragm 133 for urging pins 134 upwardly is in direct relationship to the pressure within the hydraulic system as read directly by meter 132. Hence, the amount of "loding" applied to a person's foot can be selectively established in this manner so that the insert which is ultimately constructed is based on a selected condition of "loading" against the bottom of the foot.

As shown in FIGS. 21 and 22, a hydraulic locking system for retaining the pins in a fixed state so as to retain the impression of the contour defined by the undersurface of a person's foot comprises the hydraulic cylinder 136 having a piston 137 movable between advanced and retracted positions by the clockwise and counterclockwise movements of the crank 138 rotating a threaded drive stem 139. Accordingly, hydraulic pressure can be increased in the hydraulic line 141 as detected directly by the meter 142. As thus arranged, hydraulic fluid is fed under pressure via a common line 143 to both ends of the expansible tubing 144. Thus, liquid quickly enters tubing 144 to apply a lateral pressure to bands 146 so that pins 134 are urged laterally apart and into engagement with the side edges of their respective openings 147 through which they move.

According to a preferred embodiment, shown in FIGS. 23, 25 and 26 a blank 148 to be formed to provide an insert for a shoe comprises a body 149 of foam rubber generally formed to a predetermined shoe size. The body 149 includes a flat bottom surface 151 extending from heel to toe. Body 149 further includes a relieved region 152 so as to form a relatively thin sole portion 153 to be disposed beneath a person's toes. In view of the fact that the material of region 152 is to be removed in virtually all instances the blank can be initially formed with the relieved portion 152.

A layer 154 of double-sided pressure sensitive adhesive employs protective coverings 156, 157 of a type adapted to be peeled off to expose the adhesive material therebeneath. Accordingly, protective coverings 156, 157 are shown in a partially peeled back stage in FIGS. 23 and 25.

Before adhering layer 154 to the flat bottom surface 151 of body 149 as shown in FIG. 26, it has been observed that it is highly useful to spray a light coating of glue 158, as shown in FIG. 24, from an aerosol can or otherwise onto bottom surface 151 to provide a light coating thereof upon bottom surface 151. After glue 158 has become tacky protective covering 156 can be peeled from a side of adhesive layer 154 to expose the adhesive surface. Subsequently, the adhesive surface is applied directly to bottom surface 151. As thus arranged, a pre-sized blank of material for forming an insert is provided having a bottom surface of adhesive covered by a protective sheet.

When it is desired to form blank 148 into an insert for a given person's foot, it is evident that the blank must be positioned with respect to the cutting head in a manner corresponding to the registration of a person's foot on the array 125 of pins 134. In short, where the blank 148 is of a predetermined shoe size corresponding to the shoe of a person's foot being disposed on the pins 134, means for registering the person's foot at a predetermined lateral position within the array 125 of pins 134 will be required. Means for correspondingly registering the cutting means (such as cutting head 111) with respect to blank 148 so as to conform to the impression is also provided as now to be described.

A registration assembly 159, as shown in FIGS. 19, 20 and 25, comprises an elongate pivot rod 161 carrying a pair of downwardly directed mounting pins 162 adapted to be inserted into associated openings 163 to support a registration member 164 for movement between advanced and retracted positions along rod 161. Member 164 includes a heel receiving portion 164a and a side guide 164b. For a person having a rather narrow foot an additional side guide 166 can be mounted onto the upper edge of side guide 164b by means of a pair of brackets 167 extending from the back side of side guide 166.

As thus arranged, with mounting pins 162 disposed in openings 163 to support pivot rod 161, registration member 164 can be disposed to overlay the array 125 of pins 134 as shown in FIG. 18. In this position a set screw 168, when released, serves to permit registration member 164 to move axially along rod 161. After disposing a person's toes in the position shown by phantom line 169, registration member 164 is moved forwardly until the portion 164a engages the heel of a person's foot disposed on the array 125 of pins. At that point set screw 168 can be tightened so as to establish the longitudinal and lateral postion of a person's foot 169, the ball of the foot being disposed against side guide 166 or 164b depending upon whether the person has a narrow or wide foot, respectively.

At this point the impression of the person's foot is taken in the manner described above by releasing pressure beneath pins 134, then raising the pins to provide a selected load to the underside of the foot. Following this step the pins are then locked in place to retain the impression.

With reference to FIGS. 15, 16, 19 and 25, means for correspondingly registering the cutting means or cutting head 111 with respect to a blank 148 of material to be relieved to conform to the impression taken by pins 134 comprises a hinged panel assembly 171 having a flat mounting surface 172 formed to include a pair of openings for receiving mounting pins 162 therein. Accordingly, means are provided for properly registering blank 148 onto surface 172. The hinge 173 permits assembly 171 to be laid back whereby registration assembly 159 can be removed from the region of the impression taking means 124 and disposed into assembly 171. Having so oriented the registration assembly 164 with the ball portion of blank 148 disposed against a side guide 166 or 164b, blank 148 can be lowered into adhering engagement with surface 172 to be retained thereon. Preferably surface 172 is formed of a plastic material 174 so that the adhesive can retain blank 148 securely thereto but will also permit blank 148 to be peeled therefrom after it has been formed.

In order to provide stability during an operation, a pair of treads 176 serve to flank the array 125 of pins 134 so that the person having an insert being made can lift one foot at a time.

As above described an insert for a shoe to be worn on the right foot has been provided. In order to provide an insert for use on a person's left foot registration assembly 159 is repositioned and member 164 is pivotally moved about the axis of rod 161 so as to lie on the opposite side of rod 161. At that point the mounting pins 162 can be disposed into openings 177. This arrangement is shown in FIG. 18 where the registration member is shown in phantom lines 164' and where the rod is also shown in phantom lines 161' mounted on the opposite side of the array 125 of pins 134.

Finally, as shown in FIG. 15 a shock absorber 179 serves to dampen lateral movements of control arm 112.

The embodiments shown in FIGS. 27 and 28 can be more readily understood by referring initially to FIG. 29 which shows a unit or assembly 184 for taking the impression of the undersurface of a person's foot wherein an array of pins or other extensible elements 186 are yieldingly urged to extend upwardly through associated openings in a base plate 192. While an inflatable diaphragm urges pins 186 upwardly, a person placing his foot onto the upwardly urged pins 186 will depress pins 186 therebeneath in conformity to the contour of the undersurface of the foot.

As explained above, a flow passage 188 supplies fluid, (a mixture of water and lubricant) to tubing 57 for locking pins 186 in place to retain the impression made by the person's foot placed thereon. Having formed the impression and locked the pins in place, a tracing head 183, manipulated by the control handle 185, serves to move the operating arm 182 as described above.

The embodiments of FIGS. 27 and 28 provide improved units for taking an impression of the undersurface of a person's foot. Each is characterized by means for progressively increasingly limiting the displacement of those of the pins disposed at positions progressively forwardly of the locus for supporting the ball of a person's foot.

It has been observed that when taking the impression of a person's foot the toes provide very little downward force for displacing pins 186 downwardly against the inflated diaphragm 187. Accordingly, the impression taken beneath a person's toes will normally be of insufficient depth due to the failure of the toes to provide enough downward displacement of pins 186 to accurately represent the contour beneath the toes. The embodiments of FIGS. 27 and 28 compensate for this limitation.

Thus, means, as now to be described, progressively limit the displacement of those pins 186 disposed at positions progressively forwardly of the locus 189 for supporting the ball of the person's foot. As shown in FIG. 27, that group of pins 186a disposed at positions progressively forwardly of locus 189 are progressively shortened. A tapered rigid member 191 serves to progressively limit the downward displacement of elements 186a to prevent elements 186a from dropping out of their associated guide openings in plates 192, 193. By foreshortening pins 186a and providing the tapered member 191 the person's toes are not required to force pins 186a downwardly to any great degree while at the same time permitting an accurate representation of the undersurface contour of the person's foot beneath the toes to be obtained.

As shown in the embodiment of FIG. 27 member 191 comprises a rigid body disposed at the bottom wall of diaphragm 187 beneath those of the pin elements 186a disposed at positions progressively forwardly of the locus 189. The upper surface of body 191 slopes upwardly and forwardly to limit the axial movement of pins 186a to prevent them from dropping out of their associated guide openings in plates 192, 193.

Means for locking pins 186, 186a in their depressed positions is provided as above described and designated in FIG. 27 by tubing 57' and retaining member 69'. A spacer block 73' is also provided at one end of each retaining member 69' as above described. These same elements (designated 57", 69", and 73") are also employed as shown in FIG. 28, for locking pins 194, 194a in their depressed positions.

Thus, there is provided means for progressively increasingly limiting vertical displacement of those of the pins disposed at positions progressively forwardly of the locus for the ball of a person's foot to define that portion of the impression made by that portion of the undersurface of a person's foot underlying the person's toes. An array of pins 186, 186a (or 194, 194a) as viewed in side elevation and with said elements fully extended upwardly defines a profile having a substantially straight horizontal portion extending generally from the heel region forwardly to the region 189 adapted to underlie the ball of the person's foot. The profile further includes a downwardly sloping portion extending forwardly therebeyond to progressively reduce the degree to which those pins 186a (or 194a) defining the downwardly sloping portion of the profile extend above a reference plane defined by base plate 192. This achieves a significant reduction in the force required to be applied by the toes to pins 186a (or 194a) to create an accurate negative image in the region beneath the toes.

The remaining structure shown in FIG. 27, as previously described includes the piston 227 and the connecting line 231 for supplying hydraulic fluid to diaphragm 187. Also, as noted above the rigid midplate 193 serves to confine the upward expansion of diaphragm 187.

Accordingly, it will be readily evident that there is provided means for taking an impression of the undersurface of the person's foot characterized by an array of elements 186 (or 194) movable between lowered and raised positions and by controllable means for yieldingly urging the elements upwardly. Means for disposing the upper ends of the elements to protrude progressively less at positions disposed progressively forwardly of locus 189 serves to reduce the degree of downward displacement of elements 186a (or 194a) required to be derived from the downward force applied by the person's toes.

According to the embodiment shown in FIG. 28 all of the pins 194, 194a are the same length. However, means for disposing the upper ends of pins 194a in a downwardly sloping profile as above described comprises a downwardly tapered rigid member 196, which serves to progressively constrict the expansion of diaphragm 197 and the displacement of those pins 194a disposed at positions progressively forwardly of the locus 189.

Member 196 includes a number of openings 198 for receiving pins 194a therethrough. Since pins 194, 194a shown in the embodiment of FIG. 28 are all of equal length no sorting is required before inserting them into openings 198.

A rigid panel 202 disposed above diaphragm 197 and a rigid base 201 disposed beneath diaphragm 197 serve to limit expansion of diaphragm 197. Member 196, as shown in FIG. 28, slopes downwardly and forwardly to depress the top of diaphragm 197 so as to constrict the expansion thereof in the region lying beneath pins 194a.

From the foregoing it will be readily evident that there is provided an improved system and method for the custom-making of shoe inserts which will conform exactly to the contour of the undersurface of a person's foot when subjected to a selected degree of pressure, i.e. "loading". The system and method as above described are believed readily suitable for use at the point of sale of shoes and the like since no special training is required.

I claim:

1. A system for forming a custom-made insert for a given person's shoe in which the support surface of the insert is shaped to substantially correspond to the negative image of the undersurface of the person's foot comprising impression means for selectively forming a configuration defining the contour of the undersurface of a given person's foot, controllable means operable while forming said configuration for yieldingly urging said impression means against the undersurface of a given person's foot, cutting means for shaping a blank of material following the contour defined by said configuration, means for following said configuration, means for moving the cutting means in response to the movements of the last named means, and means for disposing a blank of said material in position to be acted upon by said cutting means to be shaped to the contour of the undersurface of a given person's foot.

2. A system for forming a custom-made insert according to claim 1 in which said impression means comprises an array of elements movable between lowered and raised positions, said controllable means is operable for yieldingly urging said elements toward their raised positions against the downward force of a given person's foot disposed thereon to depress said elements selectively in accordance with the contour of the underside of the foot, and said impression means further comprises means for locking said elements thereafter in their depressed positions to define said contour.

3. A system according to claim 2 in which said last named means comprises means forming a guideway for each said element, each said element being disposed to move in an associated one of said guideways, and means acting laterally against said elements to cause them to bind against the sides of their respective guideways.

4. A system according to claim 2 in which the last named means comprises means forming guideways for said elements, said elements being disposed to move in said guideways, and means acting laterally against said elements to cause them to bind against the sides of the guideways.

5. A system for forming a custom-made insert for a given person's shoe in which the support surface of the insert is shaped to substantially correspond to the negative image of the undersurface of the person's foot comprising impression means for selectively forming a configuration defining the contour of the undersurface of a given person's foot, controllable means operable while forming said configuration for yieldingly urging said impression means against the undersurface of a given person's foot, an elongate operating arm, a cutting head carried at one end of said arm for shaping a blank of insert material, means for disposing a blank of insert material in position to be acted upon by said cutting means, tracing means carried at the other end of said operating arm, means movably supporting said operating arm to allow said tracing means to be moved to trace said configuration while causing said cutting means to shape a surface of the blank to conform to the contour of the undersurface of the person's foot.

6. A system according to claim 5 wherein said last named means comprises a carriage for supporting said arm, and means supporting said carriage to move between retracted and advanced positions to permit said tracing means to move lengthwise of said configuration, said carriage having means supporting said arm to move from side to side to permit said tracing means to travel along said configuration at various positions disposed from side to side thereof, and said carriage having means supporting said arm to pivot up and down to permit said tracing means to rise and fall with the contour defined by said configuration.

7. A system for forming a custom-made insert for a given person's shoe in which the support surface of the insert is shaped to substantially correspond to the negative image of the undersurface of the person's foot comprising impression means selectively forming a configuration defining the surface contour of the bottom of a given person's foot, controllable means operable while forming said configuration for yielding urging said impression means against the bottom of a given person's foot, shaping means disposed remotely from said impression means for shaping a blank of insert material to conform to said contour, tracing means for tracing said configuration, means for moving said shaping means in response to the movements of said tracing means, and means for disposing a blank of said material in position to be acted upon by said shaping means during movements thereof to prepare a surface of the blank to conform to said contour.

8. A system according to claim 7 wherein said impression means comprises an array of elements disposed in columns and rows, said elements being movable between lowered and raised positions, means for guiding said elements between said positions including means forming first and second axially spaced openings receiving each of said elements, said controllable means being operable for yieldingly urging all said elements upwardly to a predetermined position, and locking means for selectively locking said elements in a depressed position under the weight of a person's foot to conform to the undersurface thereof.

9. A system according to claim 8 wherein said locking means comprises an elongate inflatable expansive tubing disposed in a serpentine configuration between adjacent pairs of said columns for urging said elements laterally of the side of said tubing in response to inflation thereof to force said elements into holding engagement with the edges of said axially spaced openings containing said elements.

10. A system according to claim 8 wherein said locking means includes elongate inflatable expansive tubing means disposed between adjacent pairs of said columns for urging said elements laterally of the side of said tubing in response to inflation thereof to force said elements into holding engagement.

11. A system according to claim 5 wherein said last named means comprises a carriage for supporting said arm, and guide means supporting said carriage to move between retracted and advanced positions to permit said tracing means to move lengthwise of said configuration, said carriage having means supporting said arm to move from side to side to permit said tracing means to travel along said configuration at various positions disposed from side to side thereof, and said carriage having means supporting said arm to pivot up and down to permit said tracing means to rise and fall with the contour defined by said configuration.

12. A system according to claim 11 in which said carriage includes means for selectively holding said arm at each of said various positions to restrict lateral movement of said arm during movement of said carriage between retracted and advanced positions.

13. A system according to claim 7 comprising means for holding said blank in position to be operated upon by said shaping means, the last named means comprising a template formed to include an opening shaped substantially to the shoe size of the person, said opening being adapted to receive therein a blank of material to be used for a shoe insert, a low pressure air chamber open on one side, backing means defining said one side, and means for mounting said template to cover said one side, said blank being retained in said template opening against said backing means under the suction supplied by the low pressure within said chamber.

14. A system according to claim 7 wherein said impression means comprises an array of elements disposed in columns and rows, said elements are movable between lowered and raised positions, said system includes means for guiding said elements between said positions, said controllable means is operable for yieldingly urging all said elements upwardly to a predetermined position, and said system includes means for selectively locking said elements in a depressed position under the weight of a person's foot to conform to the undersurface thereof.

15. In a system for forming a custom-made insert for a given person's shoe in which the contour of the support surface of the insert is shaped to substantially correspond to the negative image of the contour of the undersurface of the person's foot, shaping means for shaping a surface of a blank of material to form the insert, impression means for selectively making an impression of the contour of the undersurface of a person's foot, inflatable means for retaining said impression means in condition to be traced, a tracing head movable laterlly and lengthwise of the impression and supported to rise and fall with the contour defined by the impression, and means coupled to said head for transmitting corresponding movement to said shape means.

16. A system for forming a custom-made insert for a given person's shoe in which the contour of the support surface of the insert is shaped to substantially correspond to the negative image of the contour of the undersurface of the person's foot comprising shaping means for shaping a blank of material to form an insert, impression means for selectively making an impression of the contour of the undersurface of a person's foot, inflatable means for retaining said impression means, and sensing means for sensing the contour of said impression, said shaping means being operated in response to said sensing means to shape the blank with a corresponding impression.

17. In a system for forming a custom-made insert for a given person's shoe in which the contour of the support surface of the insert is shaped to substantially correspond to the contour of the undersurface of the person's foot, means for taking an impression of the undersurface of the person's foot comprising an array of elements movable between lowered and raised positions, controllable means operable while taking said impression for yieldingly urging said element toward their raised position against the downward force of the person's foot disposed thereon to depress said elements selectively in accordance with the contour of the underside of the foot, and means for locking said elements thereafter in their depressed positions to define said contour.

18. In a system according to claim 17 said last named means comprises means forming a guideway for each said element, each said element being disposed to move in an associated one of said guideways, and means serving to urge said elements laterally to cause them to bind against the sides of their respective guideways.

19. In a system according to claim 17 said array of elements is disposed in columns and rows, and said last named means includes means forming first and second axially spaced aligned openings receiving each of said elements for guiding each of said elements between said lowered and raised positions, the axially extending edge portions of said openings being sufficiently thin as to cause said elements in said openings to be restrained against axial movement when urged laterally against those edge portions, and means selectively operable for so urging said elements to lock said elements in a positioned defined under the weight of a person's foot to conform to the undersurface thereof.

20. In a system according to claim 19 said last named means comprises an elongated inflatable expansive tubing disposed in a serpentine configuration between adjacent pairs of said columns for urging said elements laterally of the side of said tubing in repsonse to inflation thereof to force said elements into holding engagement with the axially extending edge portions of said openings containing said elements.

21. In a system according to claim 19 said last named means comprises elongate inflatable expansive tubing disposed between adjacent pairs of said columns for urging said elements laterally of the side of said tubing in response to inflation thereof to force said elements into holding engagement with the axially extending edge portions of said openings containing said elements.

22. In a system according to claim 17 the last named means comprises means forming guideways for said elements, said elements being disposed to move in said guideways, and means serving to urge said elements laterally to cause them to bind against the sides of the guideways.

23. in a system according to claim 17 said array of elements is disposed in columns and rows, and said last named means includes means forming axially spaced aligned openings receiving said elements for guiding said elements between said lowered and raised positions, the axially extending edge portions of said openings being operable to cause said elements in said openings to be restrained against axial movement when urged laterally against those edge portions, and means selectivley operable for so urging said elements to lock said elements in a position defined under the weight of a person's foot to conform to the undersurface thereof.

24. In a system for forming a custom-made insert for a given person's shoe in which the support surface of the insert is shaped to substantially correspond to the negative image of the undersurface of the person's foot with a load applied thereto, impression means, including an array of movable elements, serving to form an impression of the contour of the undersurface of a person's foot, means forming a guideway for independently guiding movement of each said element, cutting means, mounting means for mounting a blank of insert material adjacent said cutting means, and means for operating said cutting means to relieve material from said blank in conformance with said impression.

25. In a system according to claim 24 means for selectively establishing said load.

26. In a system according to claim 25 said array of movable elements comprises an array of rigid pins movable between lowered and raised positions, a diaphragm is disposed below said pins, and means is provided for feeding a fluid under pressure into said diaphragm to inflate same to urge said pins upwardly.

27. In a system according to claim 26 said diaphragm includes hydraulic fluid, and means is provided for applying a selected pressure to said diaphragm to force said pins upwardly with a selected force providing a selected load against a person's foot disposed upon said pins.

28. In a system according to claim 24 means movable to registers a person's foot with respect to said impression means, said mounting means including a flat surface movable into and out of proximity to said cutting means, said blank having an adhesive flat bottom to be adhered to said mounting means.

29. In a system according to claim 24 means movable to register a person's foot with respect to the impression means, said mounting means including a flat surface disposed adjacent to said cutting means, said blank having an adhesive flat bottom to be adhered to said mounting means.

30. In a system for forming a custom-made insert for a given person's shoe in which the support surface of the insert is shaped to substantially correspond to the negative image of the undersurface of the person's foot with a load applied thereto, impression means serving to form an impression of the contour of the undersurface of the person's foot, adjustable means serving to register the person's foot with respect to a portion of said impression means, cutting means, and mounting means for mounting a blank of insert material adjacent to said cutting means, said adjustable means being transferable to said mounting means for correspondingly registering said blank with respect to said mounting means.

31. In a unit for taking an impression of the undersurface of a person's foot, said unit having an array of elongate elements and means carrying said elements to move through an associated displacemenet defined between raised and lowered positions in response to placement of a person's foot thereon, the improvement comprising means for progressively increasingly limiting the displacement of those of said elements disposed at positions progressively forwardly of the locus for supporting the ball of the person's foot for defining the impression made by that portion of the undersurface of a person's foot underlying the person's toes.

32. In a system for forming a custom-made insert for a given person's shoe, means for selectively taking an impression of the undersurface of a person's foot, said last named means comprising an array of elements movable between lowered and raised positions with respect to a reference plane common to said elements, means for yieldingly urging said elements toward their raised positions against the downward force of a given person's foot disposed thereon to depress said elements selectively in accordance with the contour of the underside of the person's foot, means for locking said elements thereafter in their depressed positions to define said contour, and means for progressively increasingly limiting vertical displacement of those of said elements disposed and adapted to underlie that portion of the person's foot beneath the toes thereof, said array as viewed in side elevation and with said elements fully extended upwardly defining a profile having a substantially straight portion extending generally from the heel region forwardly to the region adapted to underlie the ball of the person's foot and a downwardly sloping portion extending forwardly therebeyond to progressively reduce the degree to which those of said elements defining said downwardly sloping portion of said profile extend above said plane to reduce the force required to be applied by the toes to said elements to create said impression in the region beneath the toes.

33. In a system for forming a custom-made insert for a given person's shoe in which the contour of the support surface of the insert is shaped to substantially correspond to the negative image of the contour of the undersurface of the person's foot, means for taking an impression of the undersurface of the person's foot comprising an array of elements movable between lowered and raised positions, means for yieldingly urging said elements toward their raised positions against the downward force of the person's foot disposed thereon to depress said elements selectively in accordance with the contour of the underside of the person's foot, and means for disposing the upper ends of said elements to protrude progressively less at positions disposed progressively forwardly of the locus for supporting the ball of the person's foot to reduce the degree of downward displacement of said elements to be derived from downward force applied by the person's toes.

34. In a system according to claim 33 said means for yieldingly urging said elements toward their raised positions comprises an inflatable diaphragm disposed beneath said elements for urging said elements upwardly in response to inflation of said disphragm, and said means for disposing the upper ends of said elements comprises a member progressively constricting the expansion of said diaphragm beneath those of said elements disposed at positions progressively forwardly of said locus.

35. In a system according to claim 34 said member comprises a rigid body disposed beneath said diaphragm and beneath those of said elements disposed at positions progressively forwardly of said locus, a rigid member is disposed over said diaphragm to limit upward movement of said diaphragm, and said body slopes upwardly to limit the downward displacement of said elements when said elements are moved from raised to lowered positions.

36. In a system according to claim 34 said member comprises a rigid body disposed above said diaphragm and beneath those of said elements disposed at positions progressively forward of said locus, a rigid base is disposed beneath said diaphragm to limit downward expansion of said diaphragm, and said body slopes downwardly and forwardly to progressively depress the top of said diaphragm so as to increasingly constrict the upward movement thereof.

37. In a system for forming a custom-made insert for a given person's shoe, means for selectively taking an impression of the undersurface of a person's foot, said last named means comprising an array of elements movable between lowered and raised positions with respect to a reference plane common to said elements, means for yieldingly urging said elements toward their raised positions against the downward force of a given person's foot disposed thereon to dispose said elements selectively in accordance with the contour of the underside of the person's foot, means for locking said elements thereafter in their disposed positions to define said contour, and means for progressively increasingly limiting vertical displacement of those of said elements disposed and adapted to underlie that portion of the person's foot beneath the toes thereof, said array as viewed in side elevation and with said elements fully extended upwardly defining a profile having a substantially straight portion extending generally from the heel region forwardly to the region adapted to underlie the ball of the person's foot and a downwardly sloping portion extending forwardly therebeyond to progressively reduce the degree to which those of said elements defining said downwardly sloping portion of said profile extend above said plane to reduce the force required to be applied by the toes to said elements to create said impression in the region beneath the toes.

* * * * *